United States Patent [19]

Connolly

[11] 4,319,112
[45] Mar. 9, 1982

[54] SCREEN WELDING MACHINE

[76] Inventor: James D. Connolly, 410 Johnston St., Princeton, W. Va. 24740

[21] Appl. No.: 114,290

[22] Filed: Jan. 22, 1980

Related U.S. Application Data

[62] Division of Ser. No. 949,640, Oct. 10, 1978, Pat. No. 4,221,951.

[51] Int. Cl.³ .............. B23K 9/225; B23K 37/04; B21F 15/08; B21F 27/10
[52] U.S. Cl. .............................. 219/56; 219/161; 228/49 R; 140/112
[58] Field of Search ............ 219/56, 58, 156, 161; 140/112; 228/47, 49 R, 4.5; 29/160

[56] References Cited

U.S. PATENT DOCUMENTS

| | | | |
|---|---|---|---|
| 2,469,897 | 5/1949 | Schilling et al. | 219/56 |
| 4,089,106 | 5/1978 | Seidler | 219/58 X |
| 4,221,951 | 9/1980 | Connolly | 219/56 |

FOREIGN PATENT DOCUMENTS

| | | | |
|---|---|---|---|
| 2051354 | 4/1972 | Fed. Rep. of Germany | 219/56 |
| 446374 | 4/1975 | U.S.S.R. | 219/56 |
| 443706 | 8/1975 | U.S.S.R. | 140/112 |
| 617136 | 8/1978 | U.S.S.R. | 140/112 |

*Primary Examiner*—J. V. Truhe
*Assistant Examiner*—Keith E. George
*Attorney, Agent, or Firm*—Wilmer Mechlin

[57] ABSTRACT

A machine for welding screens formed of spaced longitudinal screen wires welded at a welding station to spaced transverse rods, in which the transverse rods in succession are clamped and welded to the screen wires at the welding station, the screen wires are incrementally fed to and through the welding station and in advance of the welding station are engageable by a spacer for predetermining the lateral spacing therebetween, a platen supports and backs the screen wires against forces exerted thereon by the spacer and in clamping a transverse rod thereto, and laterally spaced and tilted slots in confronting end surfaces of the spacer and platen slidably receive and guide the screen wires for enabling the screen wires to be correspondingly tilted longitudinally of the transverse rods when welded thereto.

6 Claims, 7 Drawing Figures

SCREEN WELDING MACHINE

This application is a division of my copending application Ser. No. 949,640, filed Oct. 10, 1978 now U.S. Pat. No. 4,221,951, issued Sept. 9, 1980, for a Screen Welding Machine and also is related as machine-to-product to the Slurry Screen of my copending application Ser. No. 925,637, filed July 17, 1978 now U.S. Pat. No. 4,193,503, issued Mar. 18, 1980.

BACKGROUND OF THE INVENTION

In a machine for welding screens formed of longitudinal screen wires welded to transverse rods or wires, the transverse rods customarily are welded in succession to the longitudinal wires at a welding station to and through which the longitudinal wires are incrementally fed. The welding performed at the welding station may be either fusion or resistance welding, during which a transverse rod and the longitudinal wire or wires to which it is being welded are clamped against relative movement by a suitable means, which, as in my copending application Ser. No. 949,640, may be a ram or, as in Russian Pat. No. 322,243 of February, 1972, may be an opposed pair of welding electrodes.

In one type of welding screen widely used for both deliquefying and particle sizing, the screen wires are of inverted wedge-shape or otherwise downwardly tapered and conventionally are disposed perpendicular to the transverse rods to which their bottoms or apices are welded. By contrast, my copending application Ser. No. 925,637 discloses a welded screen in which the downwardly tapering screen wires are laterally tilted and my copending application Ser. No. 949,640, of which the present application is a division, discloses a modification of its screen welding machine for making screens having laterally tilted screen wires. It is to that part of the original disclosure that the present application is particularly directed.

SUMMARY OF THE INVENTION

The primary object of the present invention is to provide an improved machine for welding screens and the like formed of spaced longitudinal screen wires welded at a welding station to spaced transverse rods, whereby the longitudinal screen wires are incrementally fed to and through a welding station and the transverse rods are welded in succession to the longitudinal wires at the welding station and the screen wires are laterally tilted in advance of the welding station for correspondingly tilting the wires longitudinally of the transverse rods when welded thereto.

Another object of the invention is to provide an improved screen welding machine of the character described in the preceding object, wherein the screen wires are guided to the welding station at a predetermined lateral spacing and tilting by being slidably received in advance of the welding station in correspondingly laterally spaced and tilted slots in confronting end surfaces of spacer means and means supporting and backing the screen wires against forces exerted thereon by the spacer means.

A further object of the invention is to provide an improved screen welding machine of the character described in the immediately preceding object, wherein the spacer means is a vertically reciprocable spacer plate and the support means is a platen supporting and backing the screen wires against forces exerted thereon not only by the spacer means but also in clamping a transverse rod to the screen wires at the welding station.

Other objects and advantages of the invention will appear hereinafter in the detailed description, be pointed out in the appended claims, and be illustrated in the accompanying drawings, in which:

FIGURE DESCRIPTION

DETAILED DESCRIPTION

Figure 1:
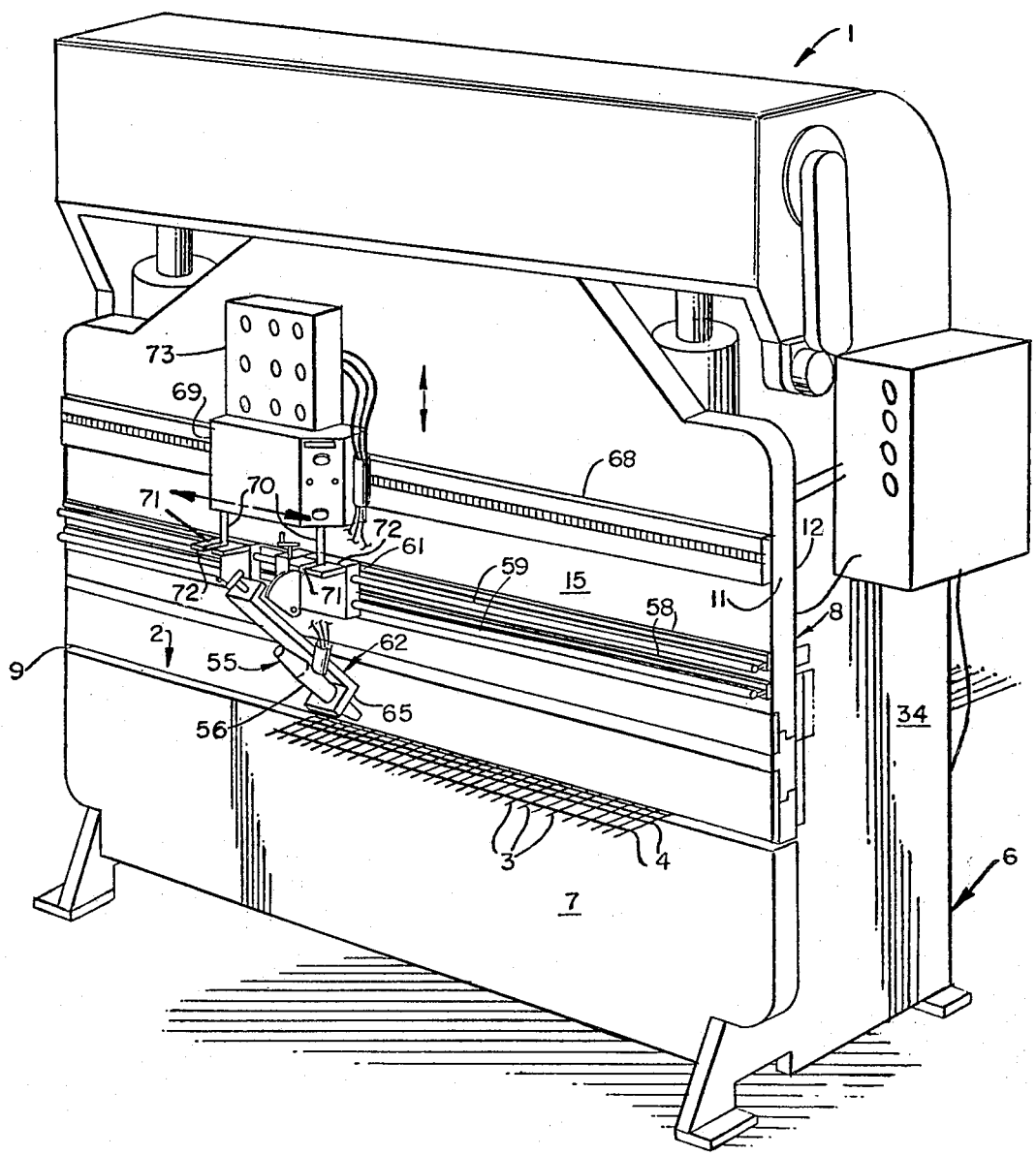
FIG. 1 is a perspective view of a preferred embodiment of the improved screen welding machine of the present invention with the ram in clamping position.
Figure 2:
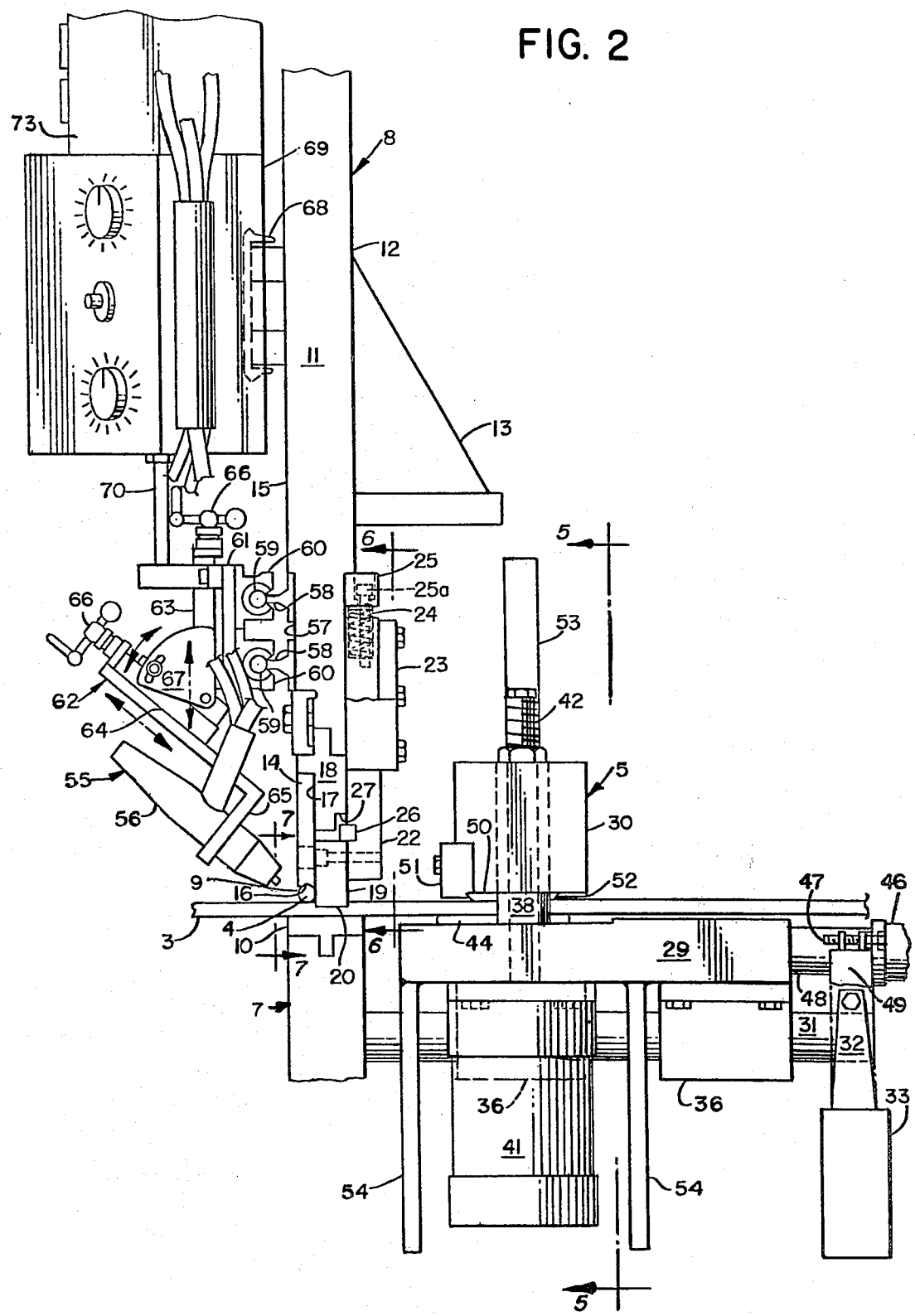
FIG. 2 is a fragmentary side elevational view on an enlarged scale of the machine of FIG. 1 with the frame and other parts removed to more clearly illustrate certain of the details of construction.
Figure 3:
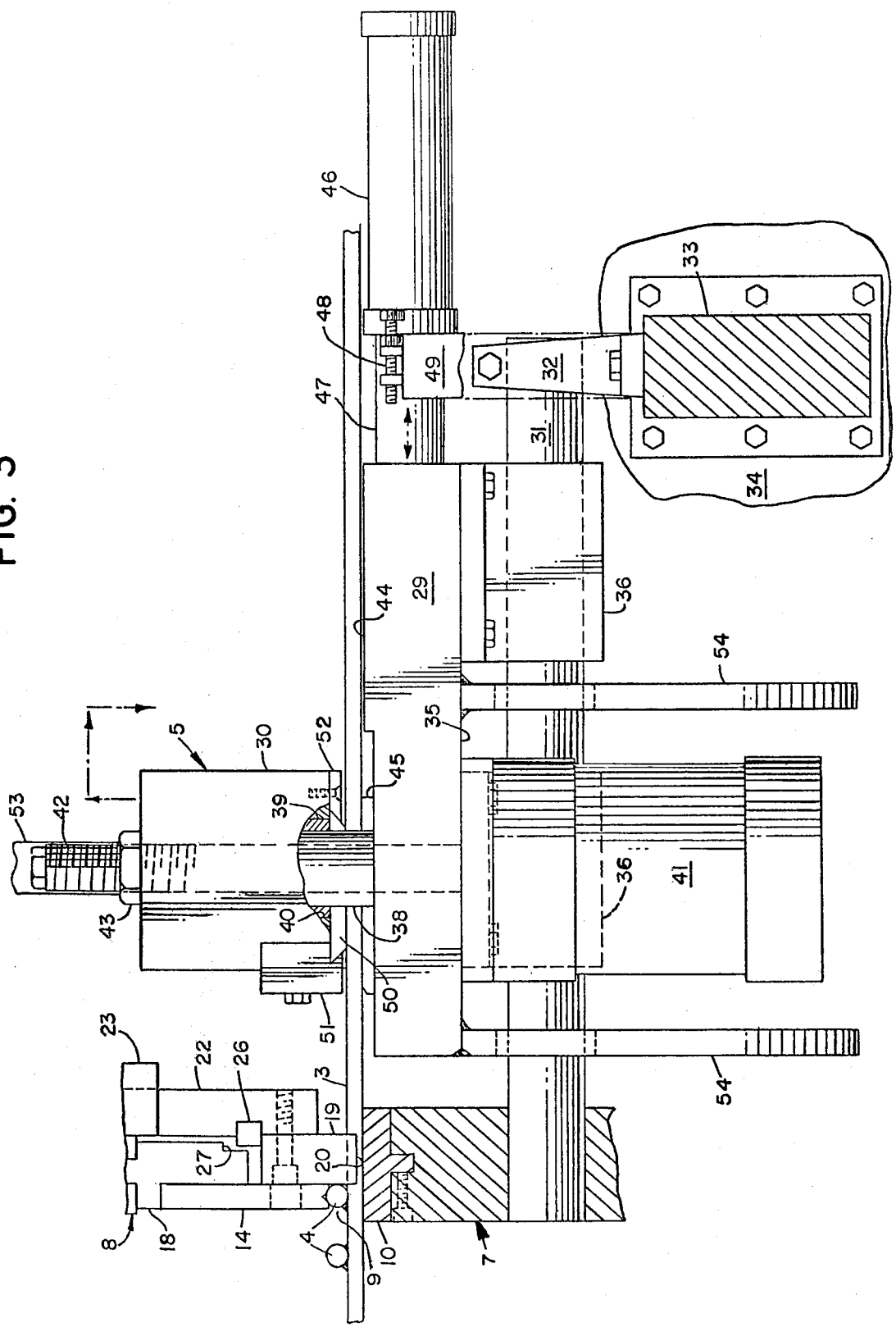
FIG. 3 is a fragmentary side elevational view of the structure of FIG. 2 on a further enlarged scale with the ram and transfer clamp assembly in their advanced or welding positions and with some portions broken away and shown in section and others added to more clearly illustrate certain of the details of construction.
Figure 4:
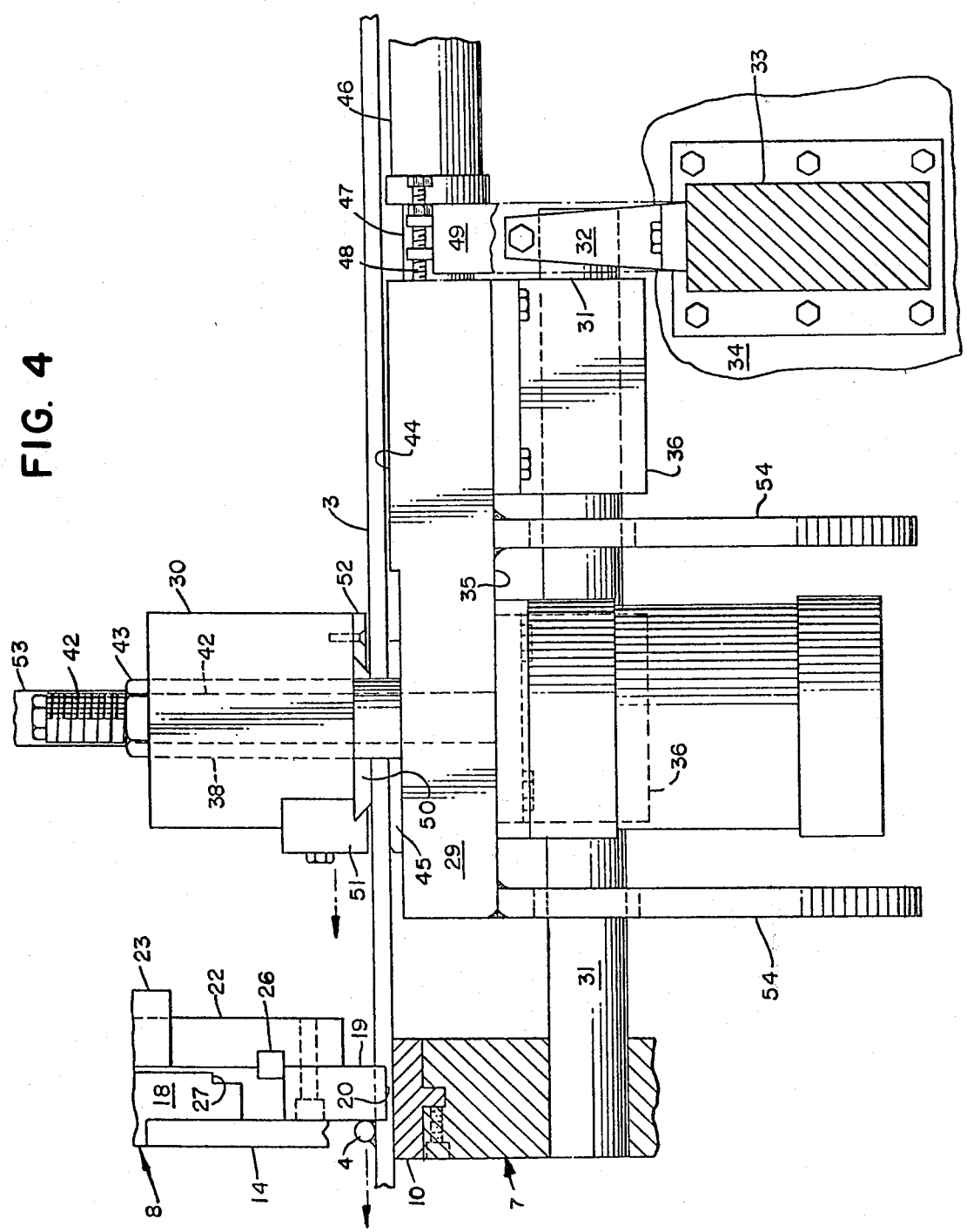
FIG. 4 is a view similar to FIG. 3 but showing the ram and transfer clamp assembly in positions for incremental advance of the longitudinal wires through the welding station.
Figure 5:
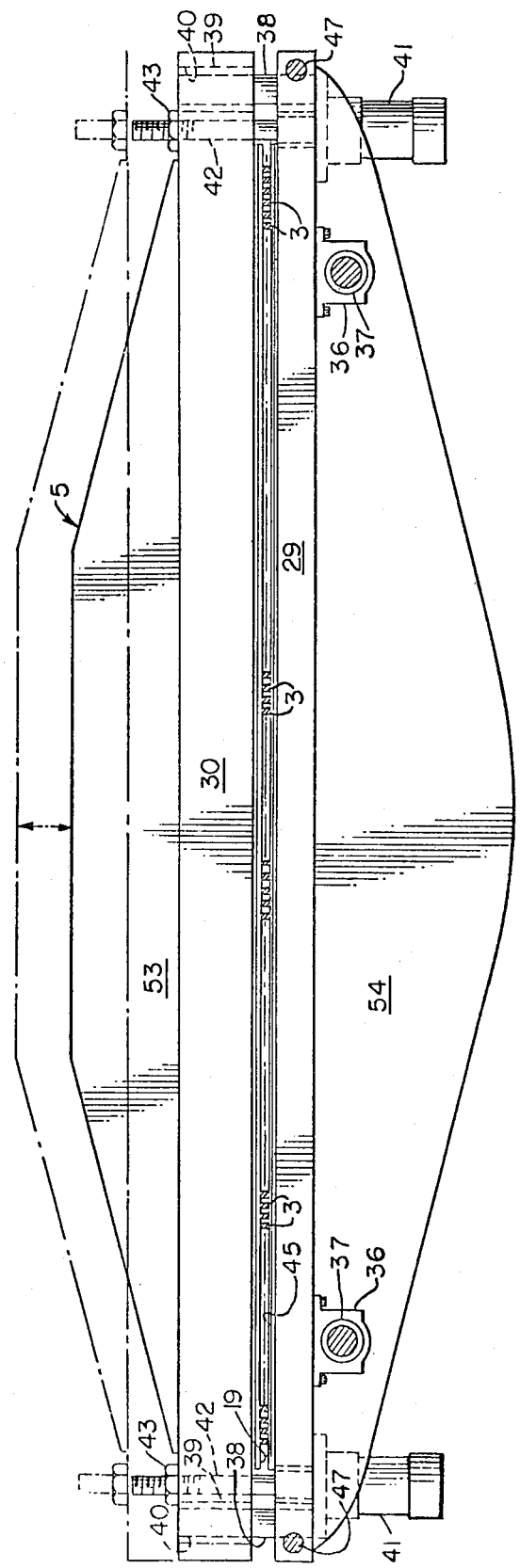
FIG. 5 is a fragmentary vertical sectional view on a reduced scale taken along lines 5—5 of FIG. 2.
Figure 6:
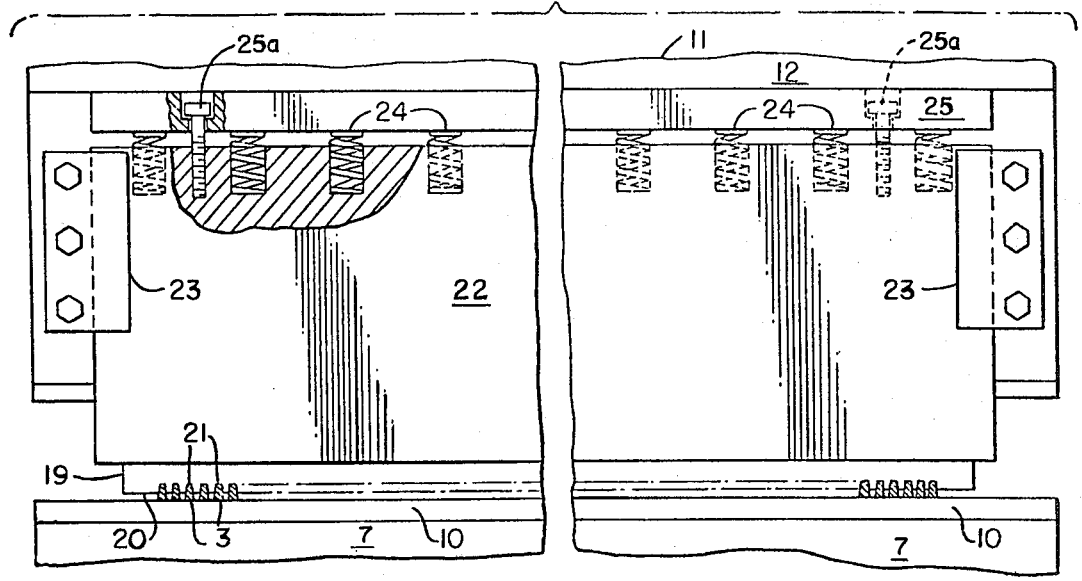
FIG. 6 is a fragmentary vertical sectional view taken along lines 6—6 of FIG. 2.

Referring now in detail to the drawings in which like reference characters designate like parts, the improved welding machine of the present invention is adapted for making screens, mats, or like weldments, hereinafter termed generally "screens", which are formed of spaced longitudinal wires or rods welded to spaced transverse rods, bars, or wires.

Designated as 1, the improved machine has a welding station 2 at which spaced longitudinal wires or rods 3 are welded in sequence or succession to spaced transverse rods, bars, or wires 4. While the transverse rods 4 may be delivered to or supplied at the welding station 2 in any suitable manner, the longitudinal wires 3 preferably are fed from the back to and pushed through the welding station by a feeding device in the form of a transfer clamp assembly 5 positioned in advance for engaging or clamping and incrementally feeding the longitudinal wires therethrough in increments predetermined by the desired lateral spacing of the transverse rods in the finished screen. Although the transfer clamp assembly 5 may be employed for feeding the longitudinal wires 3 to the welding station 2, regardless of whether the welding performed at the welding station is resistance or fusion welding, and the improved machine 1 can be adapted for resistance welding by suitable modification of the welding means and associated structure at the welding station, the illustrated machine is particularly designed for fusion welding and will be so described as exemplary of the invention.

The illustrated fusion welding machine is comprised of a frame 6 mounting toward the front a stationary platen, bed, or bed plate 7, and above the platen a press ram or pressure-applying or clamping member 8 reciprocable vertically relative to the platen between projected, advanced or down and retracted or up positions for respectively pressing or clamping a workpiece against the platen and releasing the workpiece. Generally resembling, in its frame, platen and press ram, a press brake for bending or otherwise forming metal sheets, the preferred machine 1 in these respects is an adaptation of a 55-75 ton press brake currently marketed by Houdaille Industries, Inc. under the trademark "Di-Acro", in which the ram 8 is mounted in suitable guideways (not shown) on the frame 6, hydro-mechanically powered in its advance and retract strokes, and precisely adjustable in its movement relative to the platen 7. In the machine 1 the welding station 2 is the space in and adjacent to the opening or gap 9 between the ram 8 and platen 7 through which the longitudinal wires 3 are incrementally fed and in which they are welded in succession to each of the transverse rods 4. Exemplified in its products by a welded screen for screening solids and liquid-solid mixtures in which the longitudinal wires 3 and transverse rods 4 are commonly called, respectively, screen wires and tie rods, the improved machine is particularly designed for welding a screen upside down with the screen wires resting and supported directly on the upper end of the platen 7 or, and preferably, on a wear or face plate or lower die 10 removably mounted on that end, and the tie rods 4 each in turn overlying and supported on the screen wires in position to be pressed or clamped thereagainst by the ram 8.

With a body 11 in the form of a thick flat plate suitably reinforced on its back 12 by horizontal and vertical reinforcing ribbing 13, the preferred ram 8, for applying pressure to the tie rods 4, carries or mounts a pressure plate or bar or upper die 14. Insert in the front or face 15 of the ram 8 and depending from and projecting below its body 11, the pressure plate has its lower or tie rod-confronting end 16 notched, slotted, or configured over its length to conform to or accommodate the rounded, rectangular or other configuration of the surface of the tie rod 4 presented thereto. Releasably mounted, as by screwing or bolting, on the ram 8 with its upper part seated for solid backing in a slot 17 therein, the pressure plate 14 may be unitary or sectional and be bolted or otherwise releasably mounted either directly on the body 11 or, as illustrated, on an adapter or filler block 18 fitting in and clamped on the body. In either case the pressure plate 14 is mounted against vertical movement relative to the ram 8 and preferably is readily removable for replacement by any of a plurality of interchangeable pressure plates having differently configured lower ends 16 for accommodating tie rods 4 of different shapes and sizes. The pressure plate 14 extends substantially the full width of or is coterminous laterally with the ram 8 and the welding station 2. Depending on the width of the welding station 2, which suitable may be on the order of about 7 or 8 ft. (2.13 or 2.44 m.), and the length of the screen wires 3, the machine 1 is adaptable in a single welding operation for welding a pair of wide screens in tandem for later cutting apart or two such pairs of about half or less of the maximum width so they can be welded simultaneously in and discharged abreast from the welding station. For slidably receiving and guiding the screen wires 3 at the predetermined lateral spacing through the welding station 2, as they are incrementally pushed, moved, or fed forwardly therethrough by the transfer clamp assembly 5, a spacer or guide bar 19, mounted on or carried by the ram 8 and projecting or extending below the pressure plate 14, has its under, lower or wire-presented face or surface 20 interrupted by notches or slots 21 corresponding in configuration and lateral spacing to but of less depth than the screen wires.

Extending the full width of or coextensive or coterminous laterally with the ram 8, and suitably of one piece or unitary rather than sectional, the spacer bar 19 at the front engages or abuts the back of the pressure plate 14 and the latter conveniently is apertured for therethrough bolting or otherwise releasably attaching the spacer bar at the back to a slide plate 22 slidable vertically on the back 12 of the ram body 11 in and between guide brackets 23 mounted on the body. A plurality of laterally spaced compression coil springs 24 seated in the upper end of the slide plate 22 and acting therebetween and an overlying backup bar or abutment 25 through the slide plate, yieldably urges the spacer bar 19 downwardly and not only enables the spacer bar 19 to handle screen wires of different depth, but, in the down or clamping position of the ram 8 and so long as the springs are not fully compressed, also ensures that the screen wires will be clamped by the spacer bar against the platen 7 independently of the action and relative vertical position of the pressure plate 14 in clamping a tie rod 4 to the screen wires.

For limiting its upward movement relative to the ram and preventing the springs 24 from being fully compressed or going solid, the spacer bar 19 is backed by a key 26 inset in the front of the slide plate 22 and normally spaced below and engageable with an overlying shoulder or stop 27 on either the ram body 11 or, if present, the adapter or filler block 18. With the slots 21 shallower or of less depth than the screen wires 3, the springs 24, preferably precompressed and further compressed by any downward movement of the ram 8 after the spacer bar 19 has clamped or pressed the screen wires 3 against the platen 7, when the pressure plate 14 has clamped the tie rod 4 to the screen wires under the full force of the ram, which suitably may be around 120,000 p.s.i. (8436.72 kg./sq. cm.), provide a spring force independent of the ram force for clamping the screen wires against movement during welding of a tie rod thereto. With the stroke or vertical movement of the ram 8 between up and down positions usually only about $\frac{1}{2}$ to $\frac{3}{4}$ in. (1.27 to 1.9 cm.), the spacer bar 19 preferably is lost-motion connected to the ram for adjustable limited upward movement on retraction thereof, suitably by smooth-shanked, end-threaded adjusting bolts 25a on and adjacent opposite sides of the backup bar 25 and extending vertically therebetween and the upper end of the slide plate 22. This limited upward movement of the spacer bar 19 with the ram 8 should be sufficient to release the screen wires 3 from clamping by the spacer bar for substantially resistance-free movement longitudinally relative thereto, while retaining the screen wires somewhat loosely or with slight clearance in the slots 21 for thereby restraining the screen wires against canting or twisting and maintaining their lateral spacing during such relative longitudinal movement. As in the case of the pressure plate 14, the removable mounting of the spacer bar 19 on the slide plate 22 permits interchange with like spacer bars having differently slotted or configured underfaces or lower end portions 20 to suit screen wires 3 of different sizes and shapes, such as the spacer bar for angled screen wires shown in FIG. 7.

Figure 7:
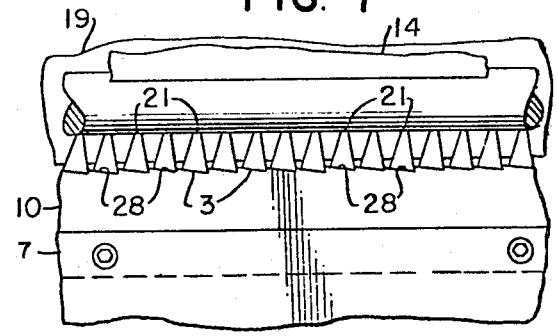
FIG. 7 is a fragmentary vertical sectional view on an enlarged scale taken along lines 7—7 of FIG. 2, showing the structure involved in adapting the machine of the present invention to make welded screens having tilted screen wires.

In addition to the slotting of the spacer bar 19 for receiving and laterally spacing the screen wires 3, if, as claimed in this divisional application, the screen wires are to be tilted relative to the tie rods 4, as shown in FIG. 7 and disclosed for a slurry screen in my copending application Ser. No. 925,637, not only will the slots 21 in the spacer bar be tilted but the screen wires preferably will seat at their then bottoms in correspondingly tilted grooves, notches or slots 28 in the wear or face plate 10 of the platen 7.

Positioned or located rearwardly or in advance of or beyond the welding station 2, the transfer clamp or feed assembly 5 by which the screen wires 3 are incrementally pushed or fed forwardly to the welding station in increments predetermined by the desired lateral spacing between the tie rods 4, is comprised of lower and upper jaws 29 and 30, respectively, the lower jaw horizontally reciprocable, normal or perpendicular to the ram 8 and welding station and parallel to the screen wires, and the upper jaw mounted, carried, or supported on the lower jaw for vertical reciprocation or movement relative thereto. Suitably a thick, generally flat plate, of substantially the same width as the welding station 2, the lower jaw 29 preferably is horizontally slidable on a pair of coplanar parallel laterally spaced support shafts 31, each at the front fitting or received in and supported by the platen 7 and at the rear clamped against movement in and supported by a bifurcated support block 32, in turn supported on a crossbeam 33 extending between and connecting the sides 34 of the frame 6. For suitably round shafts 31, the lower jaw or carrier plate 29 has bolted to and depending from its underside or bottom 35 adjacent opposite sides thereof pairs of longitudinally or axially spaced pillow blocks 36, which, for minimal friction, desirably have as bushings 37 so-called "SUPER" ball bushings marketed by Thompson Industries, Inc.

Mounted toward the front on and coextensive laterally with the lower jaw 29, the upper jaw 30 suitably is guided adjacent both sides in its vertical movement by guideposts 38, fixed to and upstanding from the lower jaw and sliding in suitably bronze bushings 39 fitted in vertical apertures 40 in the upper jaw. For vertically moving or reciprocating the upper jaw 30, the lower jaw 29 mounts on its underside 35 towards opposite sides and outwardly of the adjoining pillow blocks 36, a pair of vertically acting, fluid and preferably hydraulic cylinders or power units 41, the piston rods 42 of which extend upwardly through the upper jaw 30 adjacent and inwardly of the guidepost apertures 40 and are threadedly received in the upper jaw 30 for transmitting or applying both upward or retract and downward or advance vertical movement thereto from the cylinders 41. The piston rods 42, after being turned for predetermining the limits of vertical movement of the upper jaw 30, are locked in position by lock nuts 43.

Undercut toward the front on its upper face 44 for fixedly receiving a wear or face plate 45 upstanding above that face and at the top suitably flat and on the level of or coplanar with the top or top surface of the platen wear plate 10, the lower jaw 29 is reciprocated, shifted, or moved horizontally on and longitudinally of the guide or support shafts 31 by fluid and preferably hydraulic cylinders or power units 46 acting horizontally parallel to the shafts on the back of the lower jaw adjacent opposite sides thereof and each preferably mounted for axial or longitudinal adjustment in position on the adjoining side 34 of the frame 6. With the free or outer ends of their piston rods 47 screwed into or otherwise suitably connected to the lower jaw 29, the cylinders 46 are adapted to shift or move the lower jaw and therewith the upper jaw 30, both toward and away from the welding station 2, as well as to predetermine by the length of their stroke the limit of forward movement and thus the advanced or forward position of the jaws, while an adjustable rear stop 48, conveniently mounted on a mounting block 49 on the crossbeam 33 and engageable with the back of the lower jaw, serves to predetermine the extent of the rearward or retract movement and thus the retracted position of the lower jaw and the rearward position of both jaws.

Engaging and slidably supporting the screen wires 3 on the wear plate 45 on the lower jaw 29, the transfer clamp assembly 5 in the down position of the upper jaw 30 clamps the screen wires between the wear plate and a "K-PRENE" polyurethane or a like suitable resilient pad 50, dovetail-mounted on the bottom or lower end of the upper jaw by and projecting below front and rear mounting blocks, 51 and 52, respectively, screwed or bolted, as appropriate, to the upper jaw. Conversely, when the upper jaw 30 is shifted, moved or retracted to its retracted or up position, the resilient pad 50 thereon preferably is disengaged or free from and spaced somewhat above the screen wires 3. Although not usually necessary, the front mounting block 51, if desired, can be slotted in correspondence with the slotting of the spacer bar 19 on the ram 8 for assisting the spacer bar in spacing and guiding the screen wires 3. To withstand the compressive stresses to which they are subjected, the lower and upper jaws 29 and 30 are reinforced at the back, the upper jaw sufficiently by a single so-called "burnout" or reinforcing plate 53 upstanding from and centered laterally on and extending longitudinally of and welded to that jaw and the lower jaw by a pair of such plates 54 depending from and welded to the underside 35 of that jaw beyond opposite ends of the wear plate 45 and apertured to pass the support shafts 31.

In the illustrated machine 1 in which the tie rods are fusion welded in succession to the screen wires 3 at the welding station 2, the welding is performed by a welding assembly 55 conveniently mounted on the face or front 15 of the body 11 of the ram 8 above the pressure plate 14. The welding assembly 55 includes a torch 56 which may be adapted for fusing the tie rods 4 to the screen wires 3 by more exotic media, such as laser beams or plasma, but usually will be suited for either TIG or MIG welding, the former using a nonconsumable electrode, such as tungsten, and the latter a consumable electrode and both directing an inert gas, such as argon, at the areas being welded for preventing oxidation. While TIG welding usually is preferred, for low strength screens having small, narrowly spaced screen wires 3, the weld beads formed across the screen wires in MIG welding by the consumable electrode, may serve as cross-ties in place of the usual tie rods 4.

Whatever the form of the fusion welding, if the welds between the screen wires 3 and tie rods 4 in a finished screen are to be uniform, it is necessary that the torch 53 be so mounted and driven as to traverse the ram 8 at a precise speed and in a rectilinear path precisely parallel to the lower end 16 of the pressure plate 14 and thus a tie rod 4 clamped in welding position at the welding station 2 and that both the speed of the traverse and positions of the torch be adjustable or variable for welding screens from screen wires and tie rods of different sizes and shapes. To the above ends, if the face 15 of the ram body 11 is uneven or irregular, a planar mounting surface 57 parallel to the pressure plate 14, is machined in the lower portion of that face for mounting horizontally or laterally spaced pairs of vertically spaced supports 58 on which are mounted vertically spaced, parallel, suitably round, guide shafts, rails or ways 59 extending horizontally across the ram body. In turn, the guide shafts 59 slidably mount, preferably through a pair of horizontally spaced open Thompson roller bushing pillow blocks 60 on each shaft, a horizontally shiftable or slidable torch carriage or carrier 61.

Mounted on or carried by the carriage 61 for therewith horizontally traversing or tracking across the ram 8, the torch 56 is so connected to the carriage as to be adjustable vertically relative thereto and also in its spacing from and vertical angular disposition relative to the welding station 2, the connection 62 suitably including a first or upper slide or slide plate 63 slidably mounted on and shiftable vertically relative to the carriage, a second or lower slide or slide plate 64 angled downwardly toward the welding station 2 and connected for relative vertical pivoting through a limited arc to the lower end of the first slide plate, and an angle bracket or mount 65 directly mounting the torch and mounted on the lower slide for longitudinal sliding or shifting relative thereto. With manually adjustable screw or like precision drives 66 for adjusting the vertical position of the upper plate 63 relative to the carriage 61 and the longitudinal position of the angle bracket 65 relative to the lower slide 64 and the relative angular dispositions of the upper and lower slides adjustable through an arcuately slotted plate 67 fixed to the upper slide, the torch 56 is adjustable both vertically and longitudinally or axially and in its vertical angular disposition relative to the welding station 2 as best suits the sizes and shapes of the screen wires 3 and tie rods 4 of the particular screen being welded or fabricated.

For driving the torch carriage 61 on the guide shafts 59, the welding assembly 55 has mounted on a track 68 fixed to the face 15 of the ram 8 above and parallel to the guide shafts, a reversible, variable speed drive or tractor unit 65, rack-and-pinion or otherwise suitably drivably connected to the track. To avoid machining of the part of the face 15 of the ram 8 on which the track 68 is mounted, and still prevent transmission to the torch carriage 61 of any horizontal angling of the drive unit 69 due to irregularities in the mounting surface, the drive unit preferably is drivably connected to the torch carriage by laterally spaced vertical drive pins or bolts 70 depending or projecting downwardly from the drive unit adjacent opposite ends thereof and each fitting or received in an outwardly opening slot 71 elongated perpendicular or normal to the ram face 15 and formed in one of a pair of correspondingly spaced connecting brackets 72 on the torch carriage.

Electrically controlled and fitted or equipped with suitable electrical and fluid circuits and components (not shown) for operating its various moving parts in timed sequence, the welding machine 1 is adapted for either automatic operation or selective manual control through control panels 73 of which those involved in selective control preferably are conveniently mounted on the drive unit 69 for ready access by an operator observing the progress of the welding.

Preparation of readying of the machine 1 for a welding operation in which one or more screens are to be welded, fabricated or made of spaced longitudinal screen wires 3 and spaced transverse tie rods 4, entails selecting screen wires and tie rods of the materials and sizes and shapes desired in the finished screen or screens and, as necessary to suit the selected screen wires and tie rods, exchanging the pressure plate 14 and spacer bar 19 for interchangeable replacements, adjusting the strokes or limits of movement of the ram 8 and lower and upper jaws 29 and 30 of the transfer clamp or feed or feeding assembly 5 and the disposition and traversing speed of the selected welding torch 56, and, with the ram and both jaws in their retracted positions, manually or otherwise inserting the selected screen wires from the back or behind through the slots 21 in the spacer bar and into the welding station, suitably with their leading ends substantially flush with the front of the pressure plate.

With the screen wires 3 in place and the ram 8 and both jaws 29 and 30 initially in their retracted positions, the welding operation begins with a first welding cycle in which the upper jaw 30 is first advanced to clamping position for clamping the screen wires therebetween and the lower jaw 29 and the lower jaw is then shifted or moved to forward position for pushing or feeding forwardly through the welding station 2 a longitudinal increment of the screen wires predetermined by the desired lateral spacing of the tie rods 4 in the finished screen. Next, a tie rod 4 is placed or positioned in the welding station 2 over and across the screen wires 3, followed by advancing the ram 8 to clamp the tie rod against the screen wires and the latter against the platen 7 under the full force of the ram. Concurrently, the advance of the ram 8 enables the spacer bar 19 to separately clamp the screen wires yieldably to the platen 7 under the force of the springs 24 and independently of the force of the ram.

With the tie rods 4 and screen wires 3 now clamped against movement jointly by the pressure plate 14, spacer bar 19 and jaws 29 and 30, the welding torch 56 is fired and from one side traversed on the carriage 61 and by the drive unit 69 across the screen wires and along the tie rod for welding them to each other at their intersections. At the end of this welding step, the welding torch 56 is shut off and returned to initial position. Thereafter, with the ram 8 still in its advanced position and the wires 3 clamped against either backward or other relative movement of both the pressure plate 14 and the spacer bar 19, in sequence the upper jaw 30 of the feed assembly 5 is retracted to release the screen wires and the lower jaw is retracted to initial position. Only after the screen wires 3 are again clamped between the jaws 29 and 30, is the ram 8 retracted for releasing or freeing the screen wires for their next incremental advance or forward feeding through the welding station 2 under the pushing force of the feed assembly. In the continuation of the welding operation, the welding cycle is repeated as often as necessary to weld the intended number of screens from the screen wires initially inserted in the machine 1.

Always clamped throughout the welding operation by either or both of the ram 8 and the feed assembly 5, the screen wires 3 have no opportunity for free movement, with consequent assurance of uniformity in the relative dispositions of the screen wires and tie rods and the welds therebetween in the finished screens. Also, by adding a second welding torch 56 mounted on a separate carriage 61 connected for sliding in unison with the first carriage on the same guide shafts 59 and for drive by the same drive unit 69, and spacing the torches such that each covers approximately half the width of the welding station 2, since the welding step is by far the longest in a welding cycle, the output of the machine can be drastically increased, whether it is welding wide screens or simultaneously welding abreast relatively narrow screens.

It should be understood that the described and disclosed embodiment is merely exemplary of the invention and that all modifications are intended to be included that do not depart from the spirit of the invention and the scope of the appended claims.

Having now described my invention, I claim:

1. A machine for welding spaced longitudinal wires to spaced transverse rods, comprising means for clamping and welding the transverse rods in succession to the longitudinal wires at a welding station, means for incrementally feeding the longitudinal wires to and through said station, spacer means engageable with the longitudinal wires in advance of said station for predetermining the lateral spacing therebetween, means for supporting and backing the screen wires against forces exerted thereon by said spacer means, and slots in and tilted laterally of confronting end surfaces of said supporting and spacer means for slidably receiving and guiding the screen wires and enabling the screen wires to be correspondingly tilted longitudinally of the transverse rods when welded thereto.

2. A machine according to claim 1, wherein the slotted end surface of the supporting means is an end surface of a wear plate removably mounted on an end of the supporting means, the spacer means is a removably mounted spacer plate, and the wear and spacer plates are interchangeable with any of a plurality of pairs of wear and spacer plates having slots of different lateral tilting for correspondingly varying the lateral tilting of the longitudinal wires relative to the transverse rods when welded thereto.

3. A machine for welding spaced longitudinal wires to spaced transverse rods, comprising means for welding the transverse rods in succession to the longitudinal wires at a welding station, means for clamping each of the transverse rods to the longitudinal wires at said station, means for incrementally feeding the longitudinal wires to and through said station, spacer means engageable with the longitudinal wires in advance of said station for predetermining the lateral spacing therebetween, a platen supporting and backing the screen wires against forces exerted thereon by said clamping and spacer means, and slots in and tilted laterally of confronting end surfaces of said platen and spacer means for slidably receiving and guiding the screen wires and enabling the screen wires to be correspondingly tilted longitudinally of the transverse rods when welded thereto.

4. A machine according to claim 3, wherein the platen is stationary and the clamping means and spacer means are above and vertically reciprocable relative to the platen.

5. A machine according to claim 4, including a vertically reciprocable ram, and wherein the clamping means is mounted against relative movement on said ram, and the spacer means is a spacer plate yieldably mounted for limited relative vertical movement on said ram for alternately applying pressure to and releasing pressure on the longitudinal wires respectively on projection to clamping position and retraction therefrom of the ram.

6. A machine according to claim 3, wherein the slotted end surface of the platen is an end surface of a wear plate removably mounted on an end of the platen, the spacer means is a removably mounted spacer plate, and the wear and spacer plates are interchangeable with any of a plurality of pairs of wear and spacer plates having slots of different lateral tilting for correspondingly varying the lateral tilting of the longitudinal wires relative to the transverse rods when welded thereto.

* * * * *